(12) United States Patent
Jones et al.

(10) Patent No.: US 7,665,773 B2
(45) Date of Patent: Feb. 23, 2010

(54) SELF-TIGHTENING CLAMP ASSEMBLIES FOR PROTECTION AGAINST FULL PIPE SEPARATION

(75) Inventors: James W. Jones, Fountain Valley, CA (US); Meir Snir, Long Beach, CA (US); Hooshang Jozavi, Irvine, CA (US); Herschel Evans, Irvine, CA (US); Nasbi Guzman, Huntington Beach, CA (US); Mike Litschewski, Lakewood, CA (US); Chris Cha, Rancho Palos Verdes, CA (US); Rick Larson, Anaheim, CA (US)

(73) Assignee: ConocoPhillips Company, Houston, TX (US)

( * ) Notice: Subject to any disclaimer, the term of this patent is extended or adjusted under 35 U.S.C. 154(b) by 471 days.

(21) Appl. No.: 11/425,577

(22) Filed: Jun. 21, 2006

(65) Prior Publication Data
US 2007/0296213 A1   Dec. 27, 2007

(51) Int. Cl.
F16L 19/08 (2006.01)
F16L 21/06 (2006.01)

(52) U.S. Cl. .................. 285/421; 285/104; 285/373; 285/419

(58) Field of Classification Search ............ 285/104, 285/105, 373, 419, 420, 421
See application file for complete search history.

(56) References Cited

U.S. PATENT DOCUMENTS

| | | | |
|---|---|---|---|
| 1,352,571 A * | 9/1920 | Wyatt ......................... 249/89 |
| 2,643,137 A * | 6/1953 | Smith ......................... 285/373 |
| 4,049,296 A | 9/1977 | Harrison |
| 4,127,289 A | 11/1978 | Daspit |
| 4,171,142 A | 10/1979 | Harrison |
| 4,576,401 A | 3/1986 | Harrison |
| 4,664,426 A * | 5/1987 | Ueki ........................... 285/337 |
| 4,709,729 A | 12/1987 | Harrison |
| 4,832,379 A | 5/1989 | Smith et al. |
| 4,969,923 A * | 11/1990 | Reeder et al. ............... 285/365 |
| 5,118,139 A | 6/1992 | Lott |
| 5,161,836 A * | 11/1992 | McKinnon ................... 285/373 |
| 5,791,698 A * | 8/1998 | Wartluft et al. ............. 285/328 |
| 5,911,446 A * | 6/1999 | McLennan et al. .......... 285/104 |
| 6,106,029 A * | 8/2000 | DeMore et al. ............. 285/322 |
| 6,129,391 A * | 10/2000 | Rakieski ...................... 285/93 |
| 6,131,957 A * | 10/2000 | Saito et al. ............. 285/133.21 |
| 6,173,993 B1 * | 1/2001 | Shumard et al. .............. 285/23 |
| 6,302,450 B1 * | 10/2001 | Dole et al. ................... 285/328 |
| 6,565,125 B2 * | 5/2003 | Robison, Jr. ................. 285/104 |
| 7,341,288 B2 * | 3/2008 | Lundstrom ................... 285/369 |
| 7,384,076 B2 * | 6/2008 | Bradley ....................... 285/373 |
| 7,390,026 B2 * | 6/2008 | Noda ........................... 285/112 |
| 2002/0033604 A1 * | 3/2002 | Minemyer ................... 285/373 |
| 2003/0085566 A1 * | 5/2003 | Rex et al. .................... 285/104 |
| 2005/0052023 A1 | 3/2005 | Gill |

* cited by examiner

Primary Examiner—James M Hewitt (57) ABSTRACT

Improved self-tightening clamp assemblies are designed for application to the adjacent ends of connected pipe sections in spanning relationship to the joint therebetween. The assemblies include a plurality of clamp bodies configured for placement about the adjacent pipe section ends and carrying a plurality of pipe-engaging teeth; a clamping mechanism is operably coupled with the clamp bodies to cause the teeth to grippingly engage the pipe section ends. The teeth are oriented so as to exert an increasing gripping force on the pipe sections ends in the event of relative separation movement between the ends.

22 Claims, 7 Drawing Sheets

SELF-TIGHTENING CLAMP ASSEMBLIES FOR PROTECTION AGAINST FULL PIPE SEPARATION

The present invention is broadly concerned with improved clamp assemblies adapted for application to the joint between welded-together pipe sections in order to prevent full separation of the pipes. More particularly, the invention pertains to clamp assemblies of this character having self-tightening capabilities, i.e., the clamp assemblies exert an increasing gripping force on the engaged pipes in the event of relative separation movement between the pipes.

BACKGROUND OF THE INVENTION

Piping systems in refinery and other oil and gas plants make use of welded pipe sections of various sizes. Such pipe sections are subject to varying temperature and pressure conditions which can lead to failures, particularly at the welded pipe joints. One such failure mechanism is referred to as carbonate stress corrosion cracking, which is a common problem within fluid catalytic cracking units, especially in the main fractionator overhead condensing and reflux systems, the downstream wet gas compression systems, and the sour water systems emanating from the foregoing. Carbonate stress corrosion cracking results in leakage and cracking in carbon steel and low alloy steel piping weldments if appropriate post-weld heat treatment is not adequately performed.

When a cracking indication is detected in these systems at the weld locations, a temporary repair in the form of an external clamp is normally applied. The clamp is designed to protect the pipe against full separation while the plant is still in operation.

A variety of clamps have been proposed in the past for the temporary repair of refinery piping systems. U.S. Pat. Nos. 4,049,296, 4,171,142, and 4,709,729 illustrate such clamps having divided clamp bodies which can be installed around continuous piping in bridging relationship to a joint. These types of clamp are deficient, however, inasmuch as they do not provide any self-tightening feature which causes the clamp to effect a tighter gripping relationship with the pipe sections as the latter tend to separate. U.S. Pat. Nos. 4,127,289 and 4,832,379 and Published Application 2005/0052023 disclose pipe couplings having toothed pipe-engaging segments. However, these units do not include separable clamp bodies, and thus cannot be applied to continuous piping around existing joints.

There is accordingly a real and unresolved need in the art for improved clamp assemblies which can be installed on interconnected ends of opposed pipe sections in bridging relationship to connection joints, and which afford a self-tightening feature such that the clamp assemblies exert an increased gripping force in the event that the interconnected pipes begin to separate.

SUMMARY OF THE INVENTION

It is, therefore, an object of the invention to provide improved clamp assemblies and clamping methods designed for application to the joint between pipe sections, in order to provide a more effective clamping action even in the event of relative separation movement between the pipes.

A further object of the invention is to provide clamp assemblies and methods having self-tightening capabilities so that an increased gripping force is exerted upon clamped pipe ends in the event of separation thereof.

It is yet another object of the invention to provide improved clamp assemblies and methods wherein the assemblies are equipped with pipe-engaging teeth oriented against separation movement of the engaged pipes and further having mechanical advantage geometries which create increased gripping forces as a result of relative separation movement between clamped pipes.

One aspect of the invention concerns self-tightening clamping assemblies adapted for installation on the adjacent ends of a pair of opposed pipe sections having a joint therebetween. The clamping assembly comprises a plurality of clamp bodies configured to be placed about the adjacent pipe section ends in spanning relationship to the joint, wherein the clamp bodies have a plurality of teeth oriented for engaging both of said pipe section ends. The assemblies further include clamping mechanisms operably coupled with the clamp bodies in order to cause the teeth to grippingly engage both of the pipe section ends. The teeth are oriented relative to the adjacent gripped pipe section ends so as to exert an increasing gripping force thereon in the event of relative separation movement between the adjacent gripped pipe section ends.

In preferred forms, a pair of clamp bodies are utilized to cooperatively surround the adjacent pipe ends, wherein each of the clamp bodies has a plurality of segments carrying teeth members oriented for engagement of the pipe ends. The clamping mechanism advantageously includes a plurality of links surrounding the segments and pressing the teeth members into gripping engagement with the pipe ends.

Another aspect of the invention concerns the combination comprising a pair of opposed pipe sections having adjacent ends with a joint therebetween, together with a clamping assembly operably engaging the pipe ends in spanning relationship to the joint. The clamping assembly comprises a plurality of clamp bodies configured to be placed about the adjacent pipe section ends, wherein the clamp bodies have a plurality of teeth oriented for engaging both of the pipe section ends. The assembly further includes clamping mechanisms operably coupled with the clamp bodies in order to cause the teeth to grippingly engage both of the pipe section ends. The teeth are oriented relative to the adjacent gripped pipe section ends so as to exert an increasing gripping force thereon in the event of relative separation movement between the adjacent gripped pipe section ends.

A still further aspect of the invention relates to methods for preventing full separation of a pair of opposed pipe sections having a joint therebetween. The methods comprise the steps of applying a plurality of clamp bodies about adjacent pipe section ends in spanning relationship to the joint, with the clamp bodies carrying a plurality of teeth. The bodies are clamped to the pipe sections in order to cause said teeth to grippingly engage both of the pipe section ends. In the event of relative separation movement between the adjacent pipe section ends, the teeth are caused to exert an increasing gripping force on the gripped pipe section ends. Preferably, the teeth are oriented at an angle relative to the adjacent gripped portions of the pipe section ends, so as to create the desired enhanced gripping properties.

DETAILED DESCRIPTION OF THE PREFERRED EMBODIMENT

Turning now to the drawings, particularly FIGS. 1-7, a self-tightening clamp assembly 20 is depicted. The assembly 20 is designed for installation about the adjacent ends 22,24 of a pair of elongated pipe sections 26,28, and specifically in bridging relationship to the weld joint 30 between the ends 22,24. Broadly speaking, the assembly 20 includes a pair of clamp bodies 32,34 designed to cooperatively surround the ends 22,24, as well as a clamping mechanism 36 operably coupled with the clamp bodies 32,34 in order to draw the latter into tight gripping engagement with the ends 22,24.

In more detail, the bodies 32,34 are each formed of malleable metal and are substantially semi-circular in configuration and are designed for mating interconnection. Referring first to the body 32, it will be seen that it has a central body section 38 (FIG. 3) as well as side peripheral sections 40,42. The central section 38 is essentially imperforate and has endmost, external flange couplers 44 with through-apertures 45. Internally, the central section 38 has a pair of laterally spaced apart, inwardly extending walls 46,48 cooperatively defining a channel 50. A single fill port 52 extends through the section 38 and communicates with channel 50. As explained below, the opposed clamping section 34 also has a port 52.

Figures 3, 4:
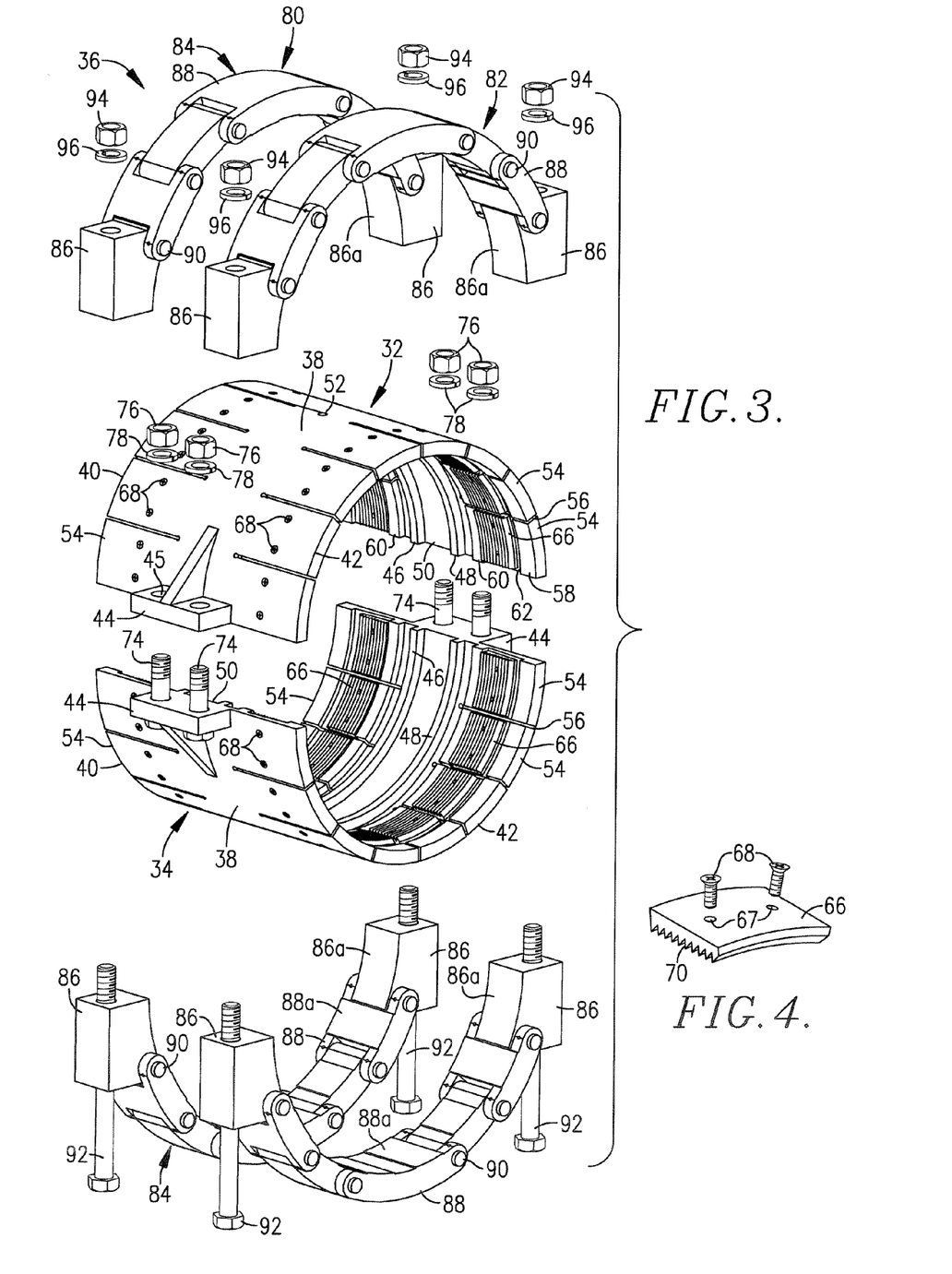
FIG. 3 is a perspective exploded view of the clamp assembly of FIG. 1.
FIG. 4 is a fragmentary view illustrating one of the toothed segments forming a part of the FIG. 1 clamp assembly.
Figure 5:
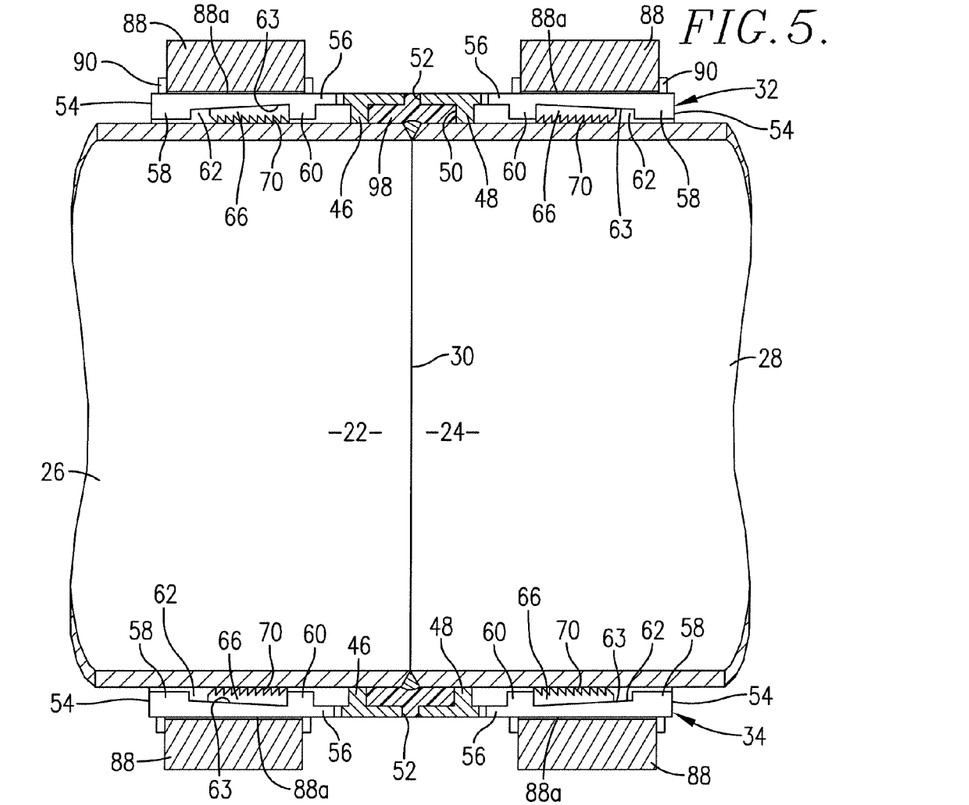
FIG. 5 is a vertical sectional view taken along line 5-5 of FIG. 1 and illustrating the initial clamping orientation of the clamp assembly disposed about the pipe section ends.
Figure 6:
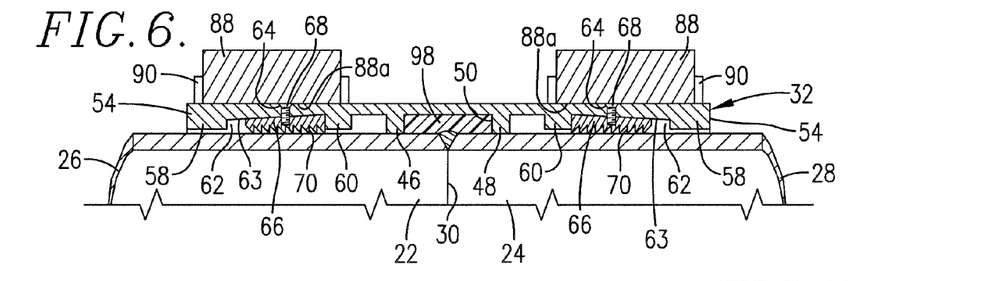
FIG. 6 is a sectional view taken along line 6-6 of FIG. 1 and illustrating the fastener connection of the toothed segments.

The peripheral sections 40,42 are each formed into eight individual segments 54 by means of seven spaced joints or cut lines 56. Each segment 54 has a pair of spaced apart, inwardly extending walls 58,60 which define a recess 62 having an oblique, sloped inner wall 63. A pair of spaced apart fastener holes 64 extend through each segment 54 and communicate with the corresponding recess 62. As best seen in FIG. 4, a toothed member 66 having threaded connection bores 67 is disposed within each of the recesses 62 and is maintained therein by means of screws 68 extending through the holes 64 and into the bores 67. The internal face of each of the members 66 presents a plurality of elongated, hardened metal teeth 70 which are slightly inclined towards joint 30 (see FIG. 5) and are designed to engage and grip a corresponding pipe section end 22,24. It will further be seen that the width of each member 66 is less than the distance between side walls 58,60; the significance of this feature will be described below.

The body 34 is substantially identical to body 32, and accordingly like reference numerals will be applied to the parts of body 34 which correspond to those of body 32. As best seen in FIG. 3, the central body section 38 is equipped with flange couplers 44, and bolts 74 extend through the apertures 45 in order to interconnect the sections 32,34; nuts 76 and washers 78 are employed to complete the connection of the clamp bodies 32,34. It will be appreciated that when the sections 32,34 are interconnected, the channel 50 is continuous throughout the entirety of the clamped assembly and that the segments 54 are uniformly spaced about the peripheral sections 40,42.

The clamping mechanism 36 is made up of two circumferential, substantially identical clamps 80,82 which are respectively disposed about the segments 54 of the peripheral sections 40,42. Thus, the clamp 80 is made up of a pair of complemental clamp halves 84 which cooperatively surround and engage the segments 54 of peripheral section 40. Each half 84 has a pair of apertured end blocks 86 with a total of five interconnected links 88 which are secured to the blocks 86 and to each other by means of lateral pin couplers 90. The inner faces 86a of the blocks 86, and the inner faces 88a of the intermediate links 88, are configured to closely conform with the outer faces of the segments 54, i.e., each of these inner faces engages one of the segment outer faces. Interconnection of the halves 84 is effected by means of bolts 92 extending through the opposed blocks 86 and secured with nuts 94 and washers 96.

The clamp 82 is identical with clamp 80, save for the fact that the clamp 82 is disposed about the segments 54 of side section 42. Therefore, like reference numerals are used throughout and no further description is warranted.

Figure 1:
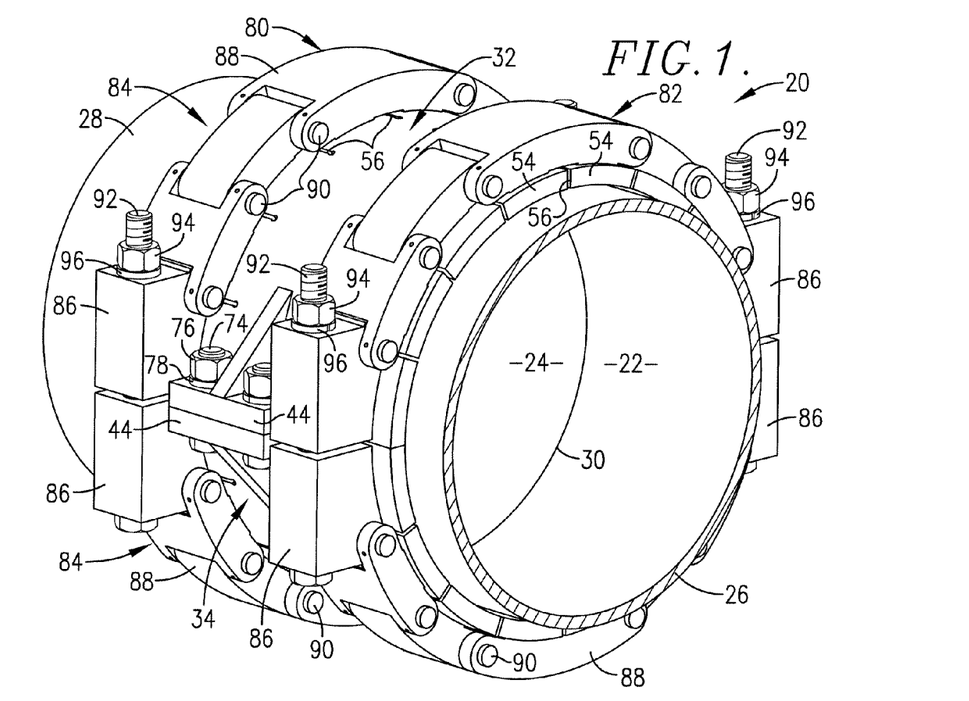
FIG. 1 is a perspective view of a clamp assembly in accordance with the invention, shown operatively coupled to the ends of a pair of interconnected pipe sections for preventing separation thereof.
Figure 2:
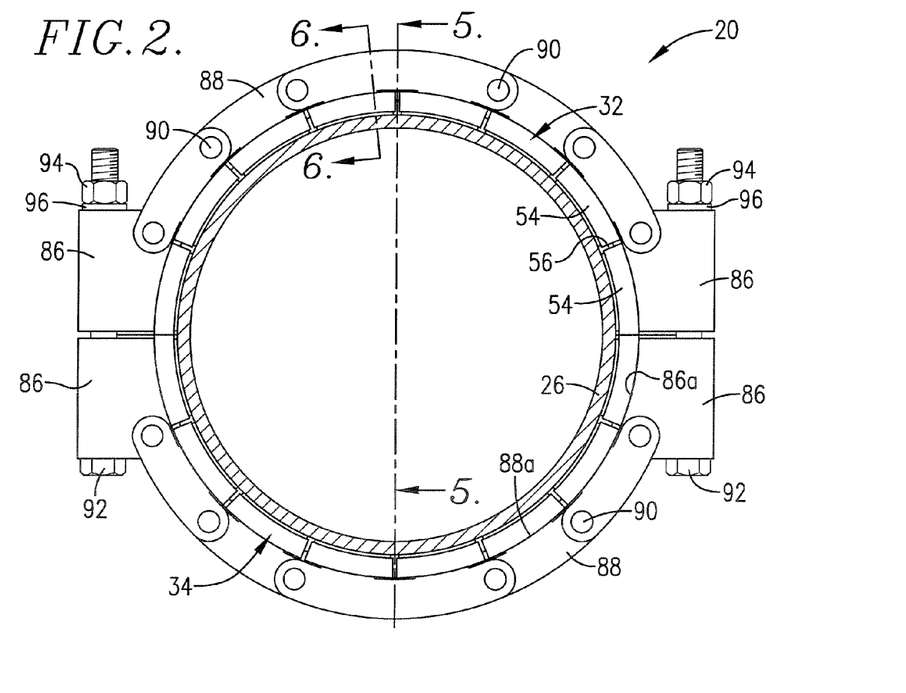
FIG. 2 is an end view of the assembly depicted in FIG. 1.

In use, the clamp bodies 32,34 are disposed about the pipe sections 26,28 in spanning relationship to joint 30, with teeth 70 of the individual members 66 in engagement with the outer surfaces of the section ends 22,24. The bodies 32,34 are then bolted together using the couplers 44 and bolts 74. The clamps 80,82 are next secured to the peripheral sections 38,40, with the inner surfaces 86a,88a in alignment with corresponding segments 54, as best illustrated in FIG. 2. The clamp halves 84 are then interconnected and drawn in to tight engagement with the segments 54 by means of the bolts 92 and nuts 94. Tightening of the bolts 94 serves to slightly deflect (either permanently or temporarily) the segments 54 inwardly so as to insure a tight gripping engagement of the teeth 70 with the outer surfaces of the pipe ends 22,24. The soft steel segments 54 allow the segments to deflect and yield as necessary so that the clamp conforms to irregular pipe surfaces, e.g., the pipes may not be precisely round or flat-sided as the case may be.

Finally, an injectable polymer resilient fill material 98 is inserted into the continuous channel 50 so that the fill material engages and spans the joint 30. This material preferably hardens but will retain a degree of resiliency for sealing purposes. It may be advisable to block the port 52 of one half of the clamping mechanism in order to effect a seal without a "leaking" of the injected material. Additionally, at the region where the clamp bodies 32,34 come together there will be a gap. It may be advisable to use a labyrinth seal or some other type of gasket to keep the injected filler material from leaking out of the clamping arrangement before it hardens.

It will be appreciated that the teeth 70 are driven into the pipe walls by the elastic response of the preloaded clamp arrangement. When the clamping bolts are preloaded initially, there is a stretching of the clamp elements and a consequent elastic compression the pipe sections.

Figure 7:
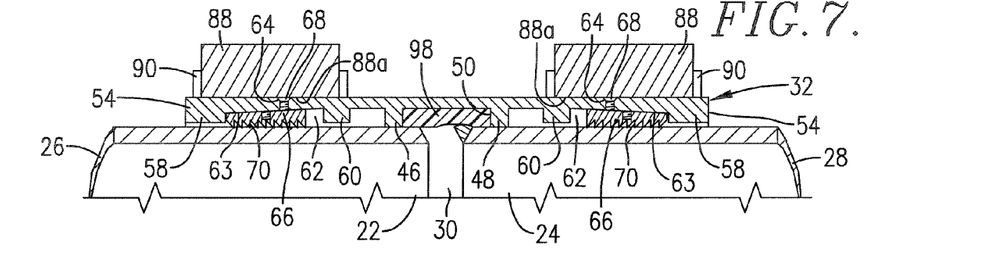
FIG. 7 is a sectional view similar to that of FIG. 6, but illustrating the operation of the clamping assembly for preventing full separation of the interconnected pipe section ends.

In the event of relative separation movement between the pipe ends 22,24 as depicted in FIG. 7, the self-tightening feature of the invention comes into play. Specifically, in such an instance, the relatively large forces generated by such separation serves to shear the screws 68 holding the members 66. At the same time, owing to the oblique orientation of the surfaces 63, an increased gripping force is generated between the teeth 70 and the pipe ends 22,24, thereby serving to minimize the separation between the pipe ends within the width of the fill material 98. This effect is augmented owing to the elasticity of the preloaded clamp/pipe section arrangement. The small motion between the teeth and pipe does not significantly reduce the preload force. The dimensions of recess 62 are a significant factor in controlling the gap 30 (FIG. 7), i.e., the amount of gripping force can be controlled by the recess dimensions, and are selected to provide enough self-tightening to grip the pipe sections but not to allow the clamping ring to become overloaded or deform the pipe sections. As such, complete failure of the pipe arrangement is avoided, thereby permitting continued operation until the separation can be permanently repaired.

Figure 8:
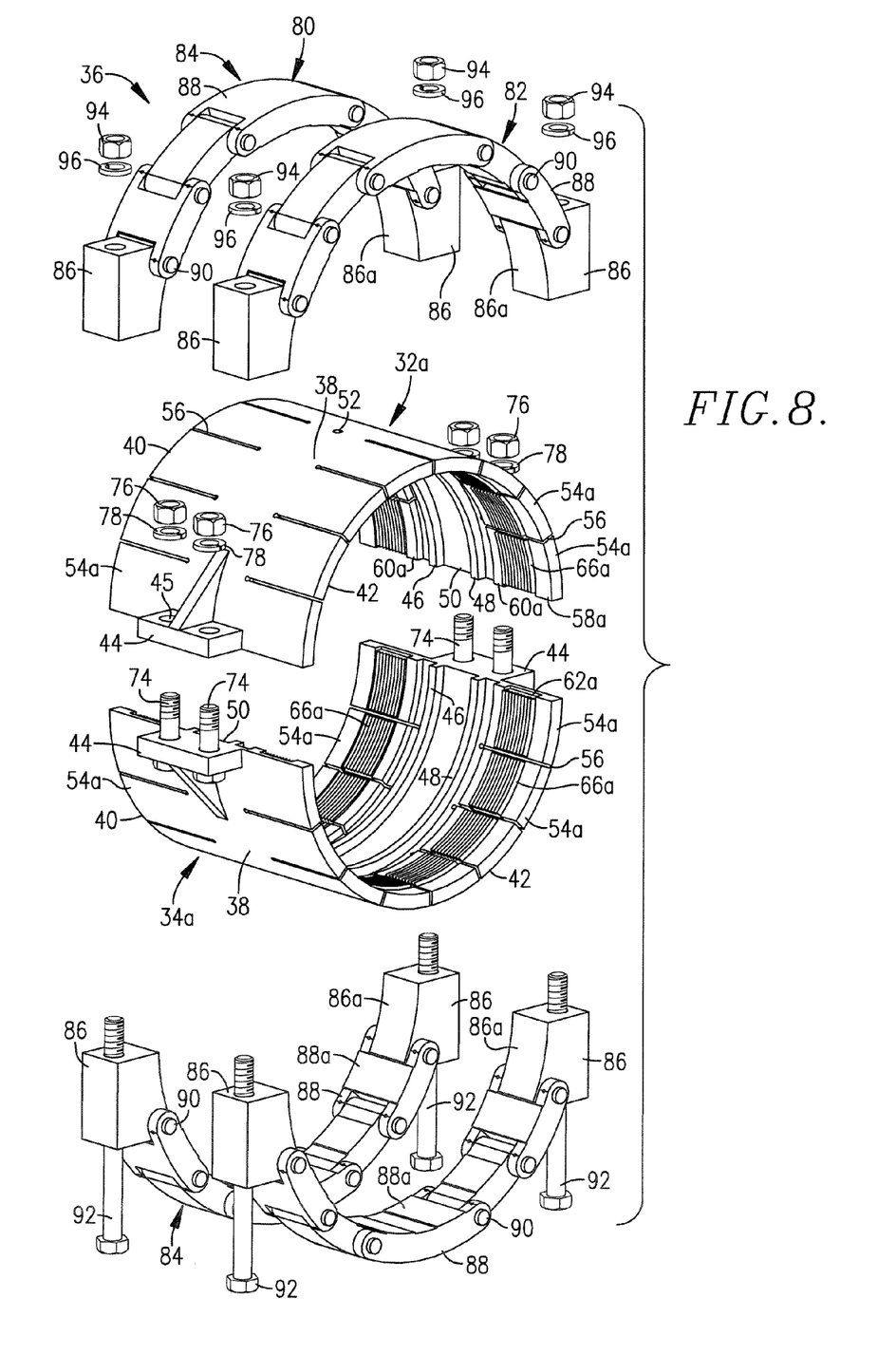
FIG. 8 is a perspective exploded view of another clamp assembly embodiment of the invention.
Figure 9:
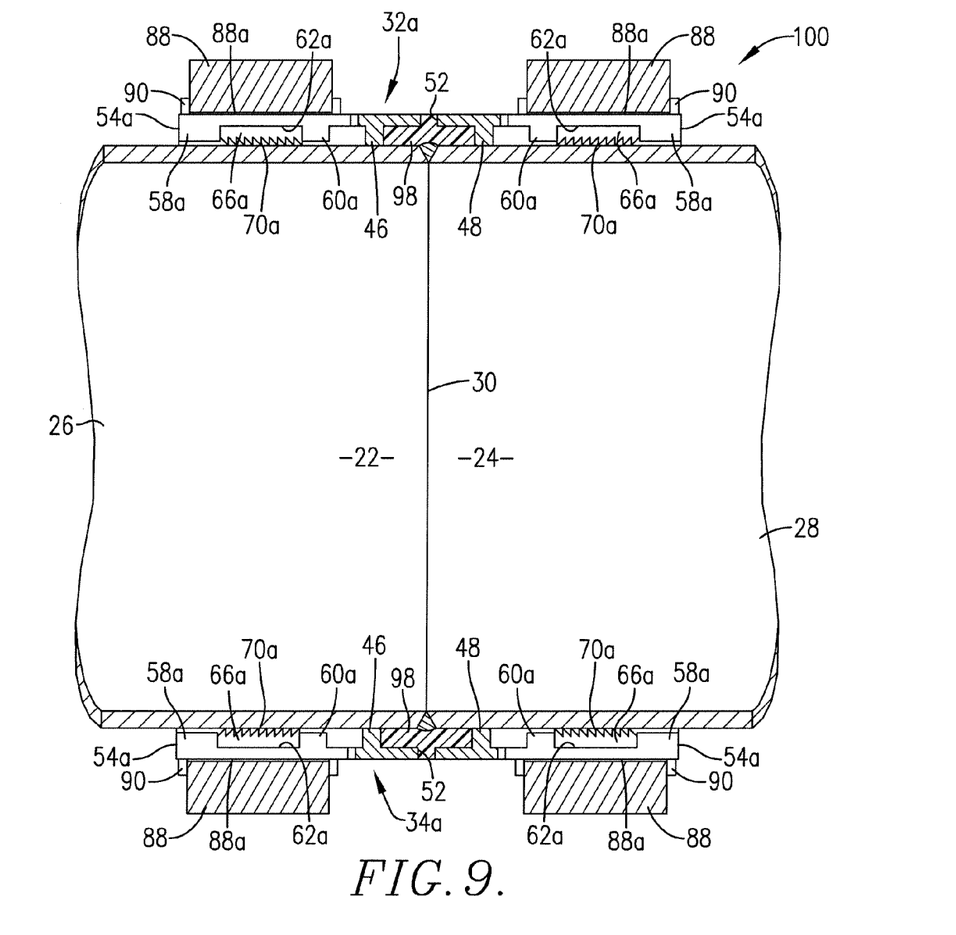
FIG. 9 is a vertical sectional view similar to that of FIG. 5, but showing the FIG. 8 clamp assembly embodiment.
Figure 10:
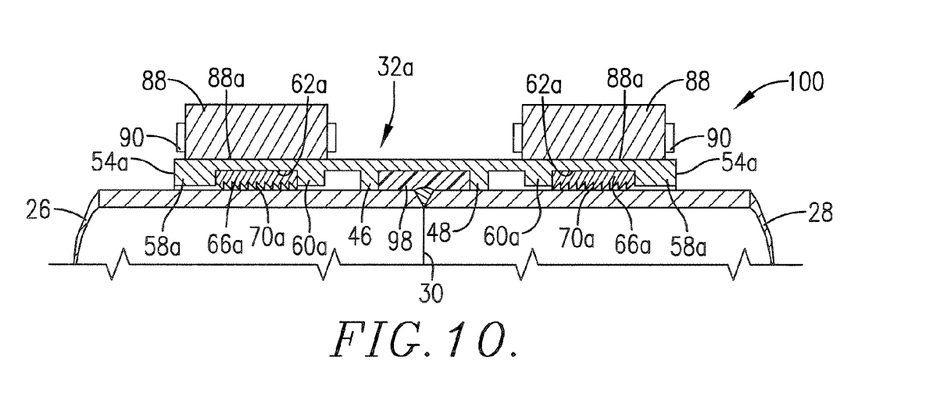
FIG. 10 is a view similar to that of FIG. 6, but again showing the FIG. 8 embodiment.

FIGS. 8-10 illustrate a modified clamp assembly 100 which is in many respects identical with assembly 20. Accordingly, like reference numerals will be used in the description of the assembly 100, and only the differences between assembly 100 and assembly 20 will be particularly discussed.

Thus, the assembly 100 is broadly made up of clamp bodies 32a,34a which differ from the previously described bodies 32,34 only in the specific construction of the individual segments 54a. In particular, these segments include inwardly directed walls 58a,60a defining recesses 62a. The latter receive toothed members 66a having inwardly directed, angularly oriented hardened teeth 70a. In this case, however, the members 66a are in a tight fitting relationship with the recesses 62a. In all other respects, the bodies 32a,34a are identical with the clamp bodies of the first embodiment. Similarly, the clamping mechanism 36, including the clamps 80,82, are identical to those of the first embodiment and need not be further described.

The use of assembly 100 is the same as that described with reference to assembly 20. However, upon relative separation movement between the pipe ends 22,24, the assembly 24 creates an increased gripping power owing simply to the orientation of the teeth 70a; the mechanical advantage derived in the assembly 20 from the use of the frangible screws 68 and the oblique surfaces 63 is not present in assembly 100.

A still further embodiment of the invention is illustrated in FIGS. 11-15, in the form of clamp assembly 102 which includes a pair of opposed clamp bodies 104,106 adapted to be mounted in spanning relationship to the joint 30 between pipe ends 22,24 of pipes 26,28. Additionally, the overall assembly 102 includes a clamping mechanism 108 applied over the bodies 104,106.

Figure 11:
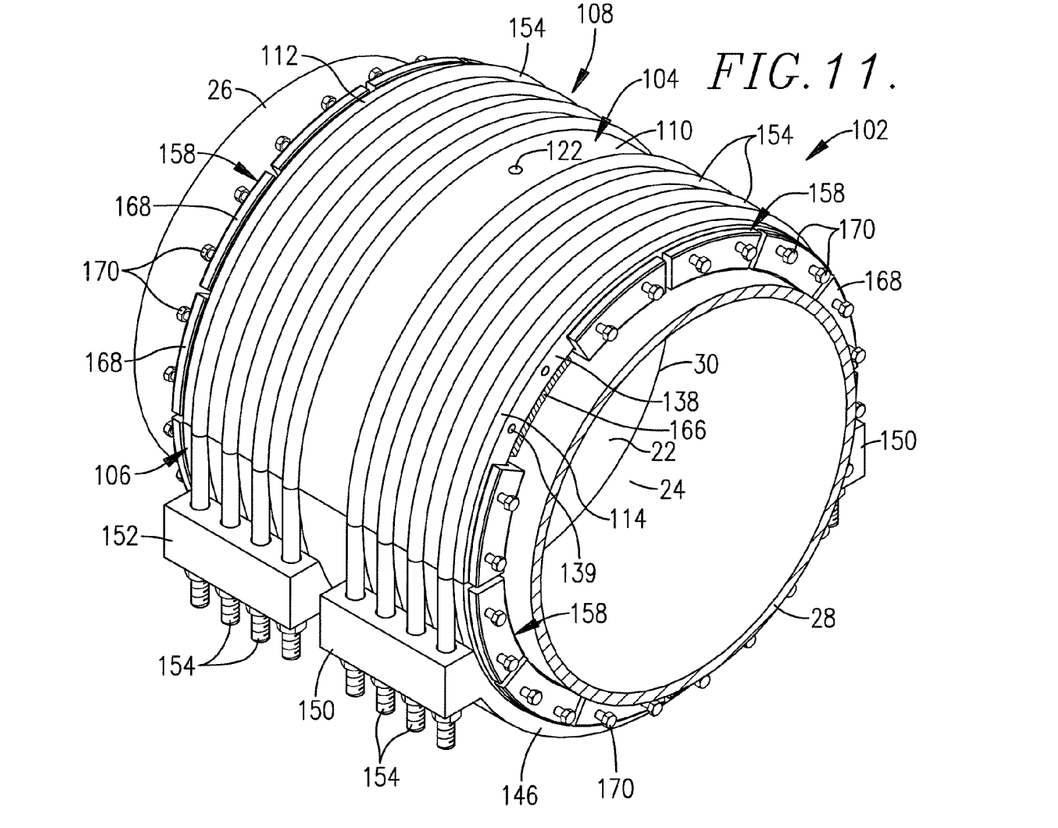
FIG. 11 is a perspective view of another clamp assembly of the invention, shown operatively mounted on the interconnected ends of opposed pipe sections.
Figure 14:
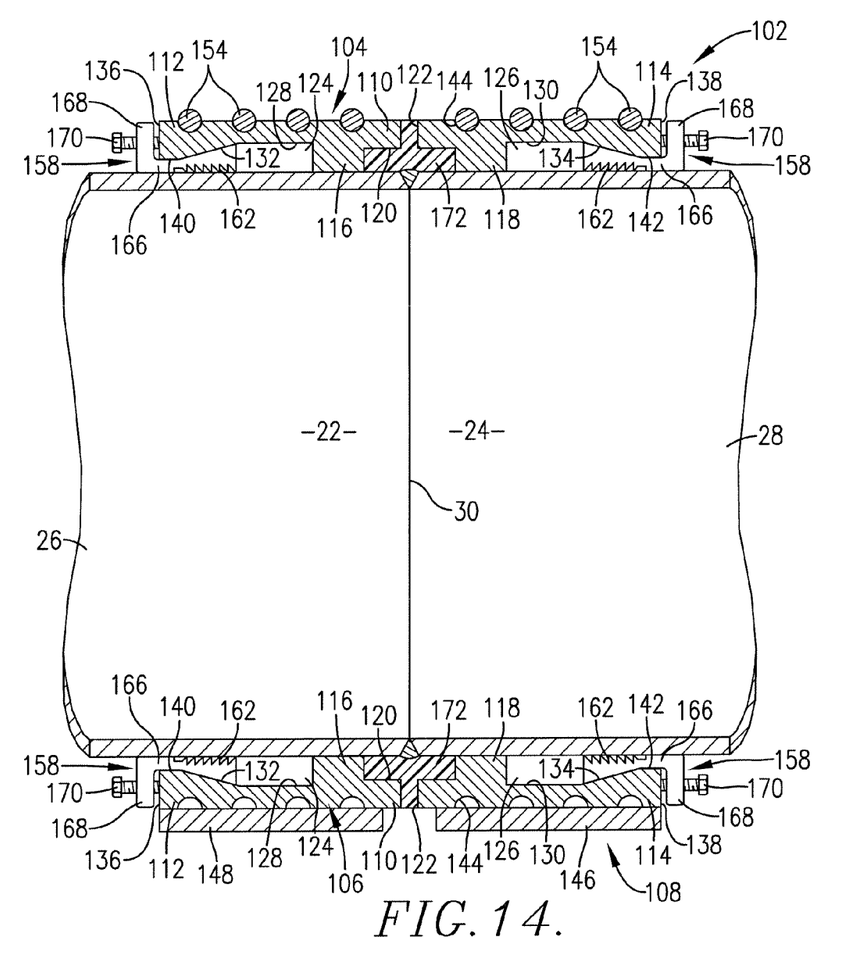
FIG. 14 is a sectional view of the clamp assembly shown in FIG. 11.
Figure 15:
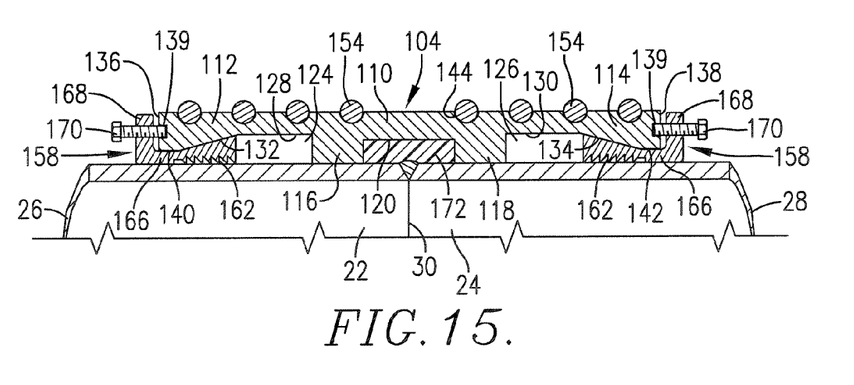
FIG. 15 is a sectional view of part of the clamp assembly shown in FIG. 11.

In more detail, the clamp body 104 is generally semicircular in configuration and includes a central section 110 as well as outwardly extending side sections 112,114. The central section 110 has a pair of laterally spaced apart, inwardly projecting walls 116,118 which cooperatively defines a channel 120. A fill port 122 communicates with the channel 120. Each of the side sections 112,114 extends outwardly from the section 110 and is spaced above the inner faces of the walls 116,118, thereby defining respective side recesses 124,126. As best seen in FIGS. 14 and 15, the inner surface of each side section 112,114 includes a surface 128,130 which is substantially parallel with the underlying pipe surface, and a sloped surface 132,134, and a terminal butt end surface 136,138; locating bores 139 are provided in these end surfaces as illustrated in FIG. 11. Thus, the sections 112,114 effectively define restricted throats 140,142 adjacent the outboard ends thereof. The outer surface of the body 104 presents a series of concavities 144 which are important for purposes to be described.

The opposed clamp body 106 mates with body 104 and is likewise arcuate so as to mate with the pipe ends 22,24. Specifically, the section 106 is essentially a mirror image of section 104, and accordingly like reference numerals are used throughout. As shown, the two bodies 104,106 cooperatively surround the ends 22,24 of the pipes 26,28.

The clamping mechanism 108 includes a pair of yokes 146,148 having apertured, endmost connection blocks 150, 152. The yokes 146,148 are designed to overlie the respective side sections 112,114 as depicted in FIG. 14. The yokes 146,148 are secured in place by means of a plurality of integral, continuous U-bolts 154 which seat within the concavities 144 of body 104 and extend through the apertures of the blocks 150,152. Nuts 156 are used to tighten the mechanism 108 and thus secure the bodies 104,106 in place.

Figures 12, 13:
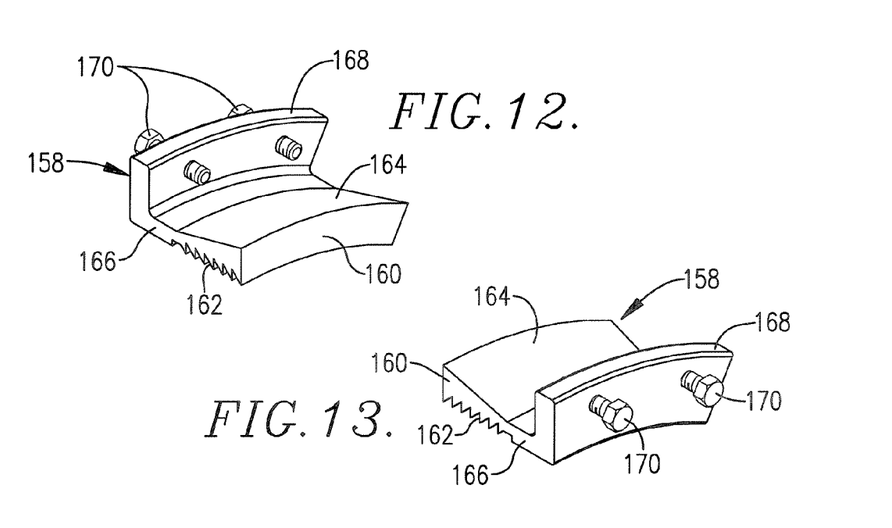
FIG. 12 is a perspective view of one of the toothed segments carried by the FIG. 11 clamp assembly adjacent one of the butt ends thereof.
FIG. 13 is a perspective view of one of the toothed segments carried by the FIG. 11 clamp assembly adjacent the opposite butt end thereof.

The overall assembly 102 further includes a plurality of tooth members 158 secured to the side sections 112,114. Referring to FIGS. 12 and 13, it will be seen that each of the members 158 includes an inboard gripping section 160 having lowermost pipe-gripping teeth 162. The sections 160 also have an inclined upper surface 164 which is complemental with the surfaces 132,134 of the side sections 112,114. In addition, each of the members 158 has a relatively thin neck section 166 which is designed to fit within restricted throats 140,142 previously described. Finally, each member 158 includes an upstanding flange section 168 having a pair of threaded bores respectively carrying spaced connection screws 170.

The members 158 are secured to the side sections 112,114 by positioning the screws 170 within the bores 139. These would be initially loosely installed on the butt ends of the sections 112,114, followed by application of the latter to the pipe ends 22,24 using mechanism 108. After the latter is installed over the bodies 104,106, the screws 170 are used to preload the respective members 158 and create a tight gripping engagement between teeth 162 and the pipe ends. The surfaces 164 of the members 158 are thereby brought into tight complemental engagement with the surfaces 132,134 of the side sections 112,114.

The final step in the attachment of assembly 102 involves filling the continuous channel 120 with resilient sealing fill material 172.

The use of assembly 102 involves initial attachment thereof to the pipe ends 22,24 as previously described. In the event of relative separation movement between the end sections, the preloaded members 158, because of the angularly oriented teeth 162 and the mechanical advantage gained by the mating oblique surfaces 164 and 132,134, causes the gripping force exerted on the pipe end sections to be increased. This prevents catastrophic failure of the pipe assembly and permits continued use thereof until a permanent repair can be made.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A self-tightening clamp assembly adapted for installation on the adjacent ends of a pair of opposed pipe sections having a joint therebetween, said assembly comprising:
    a plurality of clamp bodies configured to be placed about said adjacent pipe section ends in spanning relationship to said joint;
    a plurality of teeth carried by said clamp bodies and oriented for engaging both of said pipe section ends; and
    a clamping mechanism operably coupled with said clamp bodies in order to cause said teeth to grippingly engage both of said pipe section ends,
    said teeth being disposed on toothed elements shiftable relative to the clamp bodies along mating sloped surfaces of the toothed elements and the clamp bodies, wherein the mating sloped surfaces are oriented relative to said pipe section ends so as to exert an increasing gripping force thereon in the event of relative separation movement between said pipe section ends; and
    said clamping mechanism comprising a pair of laterally spaced apart clamping rings respectively engaging opposite end portions of said clamp bodies, each of said clamping rings comprising a plurality of interconnected link members.

2. The assembly of claim 1, there being a pair of said clamp bodies configured to cooperatively surround said adjacent ends.

3. The assembly of claim 1, each of said clamp bodies presenting a plurality of circumferentially spaced apart segments supporting the toothed elements.

4. The assembly of claim 3, said clamping mechanism comprising a plurality of interconnected link members, each link member having an inner surface located to engage the outer surface of a corresponding one of the segments.

5. The assembly of claim 3, each of said segments having a recess, there being a corresponding one of the toothed elements located within each recess.

6. The assembly of claim 5, wherein the toothed elements begin secured within the recesses by frangible fasteners and are shiftable within the recesses upon breaking of the fasteners.

7. The assembly of claim 5, each of said recesses having a sloped inner wall defining one of the mating sloped surfaces.

8. The assembly of claim 1, said clamp bodies cooperatively defining a continuous channel located in bridging relationship to said joint.

9. The assembly of claim 1, said clamping mechanism comprising interconnected sections which cooperatively surround and engage said clamp bodies.

10. The assembly of claim 1, said clamp bodies presenting a pair of opposed butt ends, there being a plurality of the toothed elements circumferentially spaced apart, disposed about said butt ends and extending inwardly therefrom, and fasteners operably coupling said toothed elements to said butt ends.

11. The assembly of claim 10, said fasteners operable to load said toothed elements in gripping engagement with said pipe section ends.

12. A self-tightening clamp assembly comprising:
    a pair of opposed pipe sections having adjacent ends with a joint therebetween;
    a plurality of clamp bodies disposed about said adjacent ends in spanning relationship to said joint;
    a plurality of teeth carried by said clamp bodies and engaging both of said pipe section ends; and
    a clamping mechanism operably coupled with said clamp bodies in order to cause said teeth to grippingly engage both of said pipe section ends,
    said teeth being disposed on toothed elements shiftable relative to the clamp bodies along mating sloped surfaces of the toothed elements and the clamp bodies, wherein the mating sloped surfaces are oriented relative to said pipe section ends so as to exert an increasing gripping force thereon in the event of relative separation movement between said pipe section ends; and
    said clamping mechanism comprising a pair of laterally spaced apart clamping rings respectively engaging opposite end portions of said clamp bodies, each of said clamping rings comprising a plurality of interconnected link members.

13. The combination of claim 12, there being a pair of said clamp bodies cooperatively surrounding said adjacent ends.

14. The combination of claim 12, each of said clamp bodies presenting a plurality of circumferentially spaced apart segments supporting the toothed elements.

15. The combination of claim 14, said clamping mechanism comprising a plurality of interconnected link members, each link member having an inner surface located to engage the outer surface of a corresponding one of the segments.

16. The combination of claim 14, each of said segments having a recess, there being a corresponding one of the toothed elements located within each recess.

17. The combination of claim 16, wherein the toothed elements begin secured within the recesses by frangible fasteners and are shiftable within the recesses upon breaking of the fasteners.

18. The combination of claim 16, each of said recesses having a sloped inner wall defining one of the mating sloped surfaces.

19. The combination of claim 12, said clamp bodies cooperatively defining a continuous channel located in bridging relationship to said joint.

20. The combination of claim 12, said clamping mechanism comprising interconnected sections which cooperatively surround and engage said clamp bodies.

21. The combination of claim 12, said clamp bodies presenting a pair of opposed butt ends, there being a plurality of the toothed elements circumferentially spaced apart, disposed about said butt ends and extending inwardly therefrom, and fasteners operably coupling said toothed elements to said butt ends.

22. The combination of claim 21, said fasteners operable to load said toothed elements in gripping engagement with said pipe section ends.

* * * * *